United States Patent
Steffen

(10) Patent No.: US 6,474,300 B1
(45) Date of Patent: Nov. 5, 2002

(54) DEVICE AND METHOD FOR CONTROLLING THE SPEED OF AN INTERNAL COMBUSTION ENGINE

(75) Inventor: Michael Steffen, Stockdorf (DE)

(73) Assignee: Wacker-Werke GmbH & Co. KG, Munich (DE)

( * ) Notice: Subject to any disclaimer, the term of this patent is extended or adjusted under 35 U.S.C. 154(b) by 0 days.

(21) Appl. No.: 09/744,466

(22) PCT Filed: Jul. 29, 1999

(86) PCT No.: PCT/EP99/05445

§ 371 (c)(1),
(2), (4) Date: Jan. 24, 2001

(87) PCT Pub. No.: WO00/06879

PCT Pub. Date: Feb. 10, 2000

(30) Foreign Application Priority Data

Jul. 30, 1998 (DE) .......................................... 198 34 443

(51) Int. Cl.[7] .............................................. F02D 31/00
(52) U.S. Cl. ................... 123/377; 123/397; 123/198 D; 173/209
(58) Field of Search ........................ 173/209; 178/189; 123/179.24, 185.1, 185.2, 339.13, 377, 400, 397, 198 D

(56) References Cited

U.S. PATENT DOCUMENTS

| | | | |
|---|---|---|---|
| 4,137,889 A | 2/1979 | Nigra | |
| 5,033,428 A | * 7/1991 | Sasaki | 123/198 D |
| 5,154,150 A | 10/1992 | Vieira | |
| 5,353,762 A | 11/1994 | Dykstra et al. | |
| 5,401,928 A | * 3/1995 | Kelley | 200/510 |
| 5,551,395 A | * 9/1996 | Isaacs et al. | 123/339.13 |
| 5,664,543 A | * 9/1997 | Taomo et al. | 123/400 |
| 6,039,024 A | * 3/2000 | Carlson et al. | 123/400 |
| 6,112,831 A | * 9/2000 | Gustafsson | 173/162.2 |

FOREIGN PATENT DOCUMENTS

| | | |
|---|---|---|
| EP | 0 242 809 | 10/1987 |
| FR | 2 574 122 | 12/1984 |

* cited by examiner

Primary Examiner—Erick Solis
(74) Attorney, Agent, or Firm—Boyle Fredrickson Newholm Stein & Gratz S.C.

(57) ABSTRACT

A device for controlling the speed of an internal combustion engine in a working tool including a device for recognizing a special operating state of the working tool. By way of example, a special operating state can be taken to mean the start-up of the internal combustion engine or a danger that can occur when the user lets go of said working tool or the tool tips over. An adjustment device adjusts the engine speed of the internal combustion engine to a safety speed that is below the operating speed of the internal combustion engine when the special operating state is recognized.

8 Claims, 1 Drawing Sheet

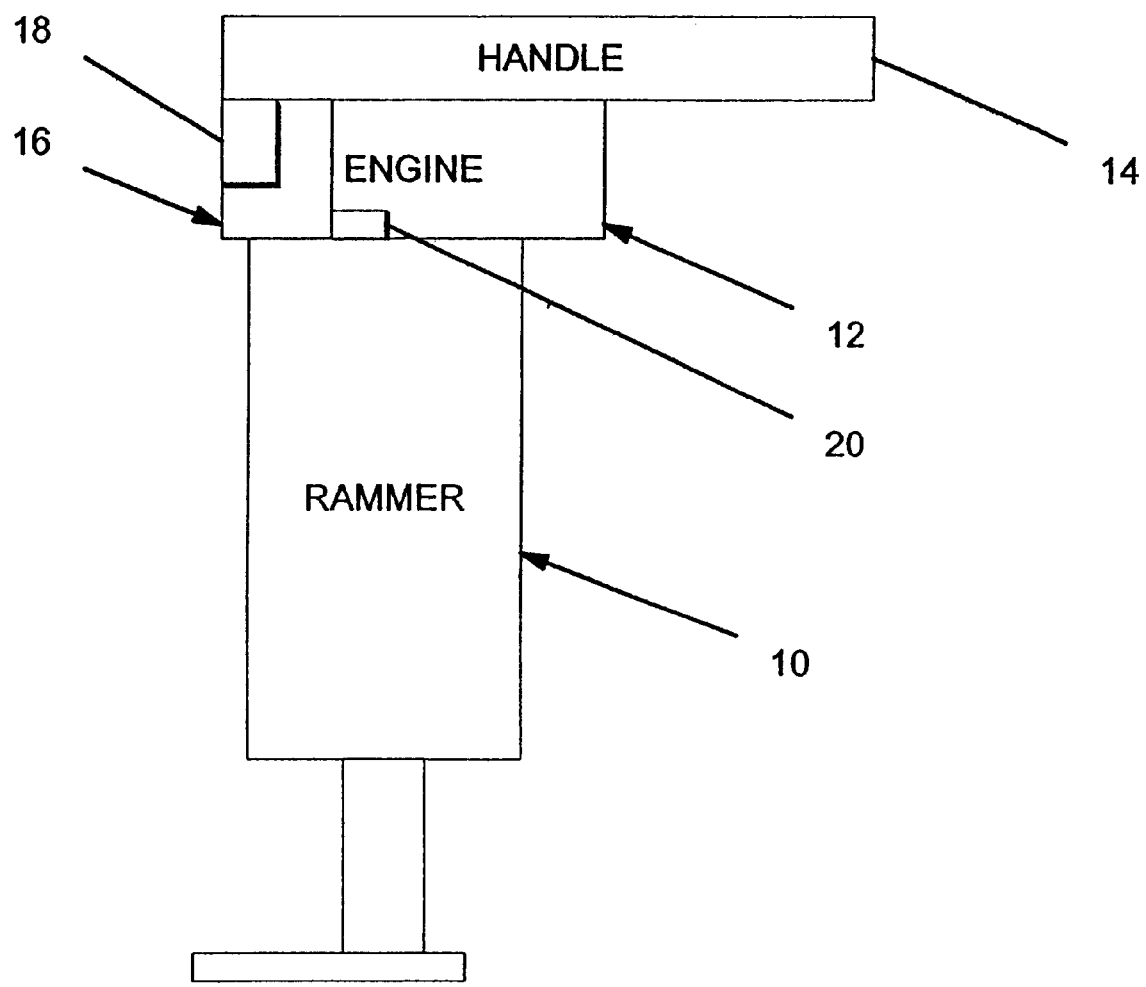
Fig.

DEVICE AND METHOD FOR CONTROLLING THE SPEED OF AN INTERNAL COMBUSTION ENGINE

BACKGROUND OF THE INVENTION

1. Field of the Invention

The invention relates to an arrangement and a method for controlling the speed of an internal combustion engine in an implement.

2. Description of the Related Art

Implements of this type, for example a vibrating rammer for soil compaction or a strike hammer, have a gasoline engine, but sometimes also a diesel engine, for the drive. The engine is—if an electric starter is not provided—usually started by actuation of the pull cable of a reversible starter. To this end, the operator firmly holds the rammer, for example, with one hand while he pulls on the pull cable with the other hand. Since the throttle lever of the engine is generally set to a full-throttle setting for the start, the engine immediately operates at a high speed which often even lies above the operating speed. This closes a centrifugal clutch which connects the engine to the ramming system, as a result of which the ramming system is put into operation. This leads to the rammer executing powerful ramming movements and the operator, who is only holding the rammer at this point with one hand, is scarcely able to control it. The ability to control it is also made more difficult by the rammer being set at a slight angle at the start so as to more easily reach the pull cable. The ramming movement does not therefore take place exclusively in the vertical direction, but also to the side, which also makes it more difficult to operate and the operator is even put at risk. Similar problems may also arise in the case of vibrating plates.

In addition, during starting a choke flap on the carburetor is generally closed and has to be opened again at the end of the starting operation. The overly rich combustion mixture directly after the starting causes the engine to operate irregularly, resulting in irregular, uncontrolled movements of the rammer. While this is happening, the operator has to attempt to reach and operate the choke lever, which is arranged on the carburetor below the operating elements, which means that he has to risk going near the erratic rammer with his head and arm. This activity is also made more difficult by it being necessary to grasp, i.e. not let go of the rammer's holding loop.

A device for limiting the speed of an internal combustion engine to a maximum permissible governed speed is described in DE 196 09 536 A1. The exceeding of the governed speed is detected by a sensor which activates, via electronics, a gear motor which overrides a throttle-lever setting and by means of which the setting of a throttle of the internal combustion engine can be influenced.

EP-A-242 809 has disclosed a vibrating plate which can be guided in a handle. Provided below the handle is an additional deadman's handle which is connected to a throttle cable. In order to bring the engine of the vibrating plate up to an operating speed, it is necessary for the operator to pivot the deadman's handle upward and to hold it against the operating handle. As soon as the operator lets go of the deadman's handle, the latter pivots downward because of its dead weight and reduces the engine speed to an idling speed via the throttle cable.

The invention is based on the object of specifying an arrangement and a method for an implement, in which uncontrolled initial operation of the implement and the more difficult handling which is associated therewith during starting, but also in the case of other special operating states, for example which put the operator at risk, are avoided.

OBJECTS AND SUMMARY OF THE INVENTION

According to the invention, the object is achieved by an arrangement in accordance with patent claim 1 and by a method in accordance with patent claim 8. Advantageous further developments of the invention are revealed in the dependent claims.

The invention specifies an arrangement for controlling the speed of an internal combustion engine in an implement, having a recognition device for recognizing a special operating state of the implement brought about by action from outside the implement, and having an adjusting device, which can be activated by the recognition device, for adjusting the engine speed to a safety speed below an operating speed of the internal combustion engine.

The recognition device makes it possible to register a special operating state of the implement, for example the starting of the implement, but also hazardous states due to letting go of holding handles of the implement or due to the implement tipping over, whereupon a corresponding signal is delivered to the adjusting device which reduces the engine speed to a perceptibly lower, and therefore nonhazardous speed, for example the idling speed. Only if the recognition device no longer recognizes a special operating state is it possible again for the operator to increase the speed.

At the special operating state, a state is advantageously recognized in which the implement is started or is not guided correctly or an angular setting of the implement which is outside a permissible range is recognized.

In order to recognize the starting operation, it is possible for the recognition device to register a rise in speed of the internal combustion engine from standstill. Furthermore, in a particularly advantageous embodiment of the invention, the recognition device can ascertain if the ignition system of the internal combustion engine is supplied with power, which is likewise interpreted as a starting operation. This embodiment is suitable in particular for internal combustion engines having a magneto ignition system, in which the ignition power is not provided by an external power source, but is produced directly by a magnetic wheel revolving on the engine shaft. The presence of ignition power is then equivalent to the exceeding of a certain engine speed.

As an alternative to this, it is also possible to find solutions for every other type of ignition system which enable the starting operation and/or the rise in speed to be recognized. In the case of battery ignitions it is possible, for example, to pass on a signal, which is taken from the crankshaft and corresponds to the speed of the crankshaft, to the recognition device.

In another advantageous embodiment of the invention the recognition device has a timing element by means of which a predetermined period of time after starting of the engine is monitored and during which the engine speed is adjusted to a safety speed. Only after the predetermined period of time has elapsed is it possible for the adjusting device to increase to operating speed, it being assumed that after the period of time has elapsed, the engine operates regularly and the operator has in the meantime gained control over the rammer or over the implement.

A particularly advantageous further development of the invention is defined by the recognition device having at least one switching or sensing unit. A switching or sensing unit of this type may be a safety loop or handle which can be held by the operator. Also conceivable are corresponding sensors on the holding handle, the sensors being used to register the fact that the operator is holding the holding handle of the implement correctly. only in this case does the recognition device recognize a normal operating state enabling running at the operating speed.

In another further development of the invention the recognition device has a device for determining the position of the implement, in particular the angular position, and, when a predetermined position limit is exceeded, recognizes a special operating state.

This makes it possible, for example when the implement turns over, to immediately adjust the internal combustion engine to a safety speed and to avoid putting the operator at risk.

A method according to the invention for controlling the speed of an internal combustion engine in an implement has the following steps:

recognition of a special operating state of the implement, and if a special operating state has been recognized, adjusting the engine speed to a safety speed below an operating speed of the internal combustion engine.

Both the arrangement and the method can be used particularly advantageously in the case of a rammer or a strike hammer having an internal combustion engine.

These and further advantages and features of the invention are explained in greater detail below with reference to preferred embodiments.

BRIEF DESCRIPTION OF THE DRAWING

A preferred exemplary embodiment of the invention is illustrated in the accompanying drawing.

DETAILED DESCRIPTION OF THE PREFERRED EMBODIMENTS.

Referring to the FIGURE a rammer 10 for soil compaction, in which the arrangement according to the invention is advantageously used, powered by an engine 12 and controlled by a handle 14. The engine 12 is operated by a conventional magneto ignition system 20, a magnetic charging pulse being output via a magnet wheel arranged on the crank on each revolution of the crank. Electronics 16 which are known per se are able to detect the engine speed by the temporal spacing of the magnetic charging pulses. Depending on the operating state of the engine 12, the electronics then control the ignition system 20 to introduce ignition measures for the desired speed value, for example by adjusting the ignition point or by getting rid of individual ignition pulses. This enables the engine speed to oscillate around the value determined by the electronics 16. In the case of other known speed regulating means, interventions in the carburetor system are undertaken for example by influencing the throttle setting.

According to the invention, a recognition device 18 in the electronics 16 now recognizes that the implement is to be started and to this end preselects an engine speed lying below the switch-on speed of a centrifugal clutch which connects the engine 12 to the rammer 10 or to a striking system for a hammer. This so-called safety speed should always lie at a comparatively low value below the operating speed so as to ensure that the operator is able to control the implement as it starts.

The recognition that the engine is to be started can be obtained by the recognition device in various ways.

In one embodiment of the invention the electronics 16 register a transfer of speed from standstill to a certain minimum speed. The rise in speed is interpreted as meaning that the operator has actuated the reversible starter via the pull cable.

In another embodiment of the invention the electronics 16 recognize the presence for the first time of ignition power in the ignition system 20. As already described, the magneto ignition system in particular produces its ignition power itself with the aid of the magnetic wheel arranged on the crankshaft, with the result that the presence of ignition power and/or a rise in ignition power is equivalent to a rise in speed.

In yet another embodiment of the invention a two-position switch or a push-button switch is provided, which switch is normally in a stand-by position in which the engine rotates at the safety speed and which has to be actuated by the operator in order to set the implement into operation, whereupon the engine 12 can rotate at the operating speed. To this end, an additional safety loop, which the operator has to firmly hold in order to set the implement into operation, may be provided on a holding handle or loop of the implement. If the operator is only able to operate the implement at the operating speed if he firmly holds it with both hands, it is correspondingly also possible to provide two safety loops. Instead of safety loops, in other embodiments of the invention it is expedient to provide sensors, switches or push-button switches, for example even capacitive or optical proximity switches or touch-sensitive handle elements.

When the electronics 16 have recognized the presence or absence of the special operating state, the speed is adjusted e.g., by suitable control of the ignition system 20, in a manner which is known per se and is partially described above. Apart from the speed-regulating means for gasoline engines, it is also possible for the speed of diesel engines to be controlled.

The increasing of the speed beyond the starting or safety speed to the operating speed is only possible if the electronics 16 no longer recognize the special operating state. Apart from the options described previously, this may also be affected by the electronics receiving a further pulse, for example by the operator shifting a switch arranged on the operating elements or actuating a button. During the entire period of the special operating state the throttle lever can be in the full-throttle or operational setting without actually affecting the engine speed as a result.

In another embodiment of the, invention the electronics 16 have a timing element which is triggered at the beginning of starting and only after a certain period of time has elapsed after starting of the engine permits it to be brought up to the operating speed. It is assumed here that the operator has in the meantime gained complete control over the implement.

Furthermore, a measuring arrangement is possible which monitors the running of the engine or of the entire implement, and only when it runs correctly permits the speed to be increased to the operating speed.

Apart from the starting operation further operating states are also conceivable which may be critical for the implement or the operator. These include states in which the operator entirely lets go of the implement or holds it only with one hand for a prolonged period of time. It may likewise be critical if the implement takes up an impermissible angular or lateral position or even tips over.

These states can be detected by additional sensors, switches or push-button switches, for example by means of two push-button switches which have to be held by the operator during operation of the implement. When a corresponding signal is output by the sensors or the like, the electronics recognize a special operating state and immediately reduce the speed to the safety speed level, as a result of which a risk to man and machine is prevented, or is at least reduced.

I claim:

1. An arrangement for controlling the speed of an internal combustion engine in an implement, comprising:
    a recognition device which is configured to recognize a special operating state of the implement brought about by an action from outside the implement; and
    an adjusting device which can be activated by the recognition device and which is configured to adjust the engine speed to a safety speed below an operating speed of the internal combustion engine, wherein the special operating state that is recognized is a state in which an angular setting of the implement is outside of a permissible range.

2. The arrangement as claimed in claim 1, wherein the recognition device has at least one switching or sensing unit and, as a function of a setting of the switching or sensing unit, recognizes a special operating state.

3. An arrangement for controlling the speed of an internal combustion engine in an implement, comprising:
    a recognition device which is configured to recognize that the engine is started; and
    an adjusting device which can be activated by the recognition device and which is configured to adjust the engine speed to a safety speed below an operating speed of the internal combustion engine, wherein the recognition device is configured to recognize a rise in speed of the engine from standstill.

4. The arrangement as claimed in claim 3, wherein the recognition device has a timing element which can be triggered during starting of the engine, and wherein the adjusting device adjusts the engine speed to a safety speed as long as a time period determined by the timing element has not elapsed.

5. An arrangement for controlling the speed of an internal combustion engine in an implement, comprising:
    a recognition device which is configured to recognize that the engine is started; and
    an adjusting device which can be activated by the recognition device and which is configured to adjust the engine speed to a safety speed below an operating speed of the engine, wherein the recognition device is configured to determine that the engine has started by recognizing that an ignition system of the engine is supplied with power, and wherein, upon recognizing that the internal combustion engine is supplied with power, the recognition device activates the adjusting device to adjust engine speed to the safety speed.

6. An arrangement for controlling the speed of an internal combustion engine in an implement which can be steered using a holding handle, comprising:
    a recognition device which is configured to recognize an operating state of the implement which is brought about by action from outside the implement; and
    an adjusting device which can be actuated by the recognition device and which is configured to adjust the engine speed to a safety speed below an operating speed of the internal combustion engine;
    the special operating state being a state in which the implement is not steered correctly;
    wherein the recognition device has a sensor arrangement on the holding handle which is configured to automatically recognize whether the implement is being steered correctly.

7. An arrangement for controlling the speed of an internal combustion engine in a implement which can be manually guided using a holding handle, the arrangement comprising:
    a recognition device which is configured to recognize a special operating state of the implement which is brought about by action from outside the implement, the special operating state being a state in which the soil compaction device is not guided correctly; and
    an adjusting device which can be actuated by the recognition device and which is configured to adjust the engine speed to a safety speed below an operating speed of the internal combustion engine;
    wherein the recognition device has a sensor arrangement on the holding handle which is configured to automatically recognize whether the implement is being guided correctly, and wherein the recognition device has a device that determines the angular position of the implement and, when a predetermined position limit is exceeded, recognizes the special operating state.

8. An arrangement for controlling the speed of an internal combustion engine in a implement which can be manually guided using a holding handle, the arrangement comprising:
    a recognition device which configured to recognize a special operating state of the implement which is brought about by action from outside the implement, the special operating state being a state in which the soil compaction device is not guided correctly; and
    an adjusting device which can be actuated by the recognition device and which is configured to adjust the engine speed to a safety speed below an operating speed of the internal combustion engine;
    wherein the recognition device has a sensor arrangement on the holding handle which is configured to automatically recognize whether the implement is being guided correctly, and
    wherein the implement is a soil compaction device comprising one of a rammer and a strike hammer.

* * * * *